US010186079B2

(12) United States Patent
Schmidt

(10) Patent No.: US 10,186,079 B2
(45) Date of Patent: Jan. 22, 2019

(54) ADAPTIVELY JOINING MESHES

(71) Applicant: AUTODESK, INC., San Rafael, CA (US)

(72) Inventor: Ryan Michael Schmidt, Toronto (CA)

(73) Assignee: AUTODESK, INC., San Rafael, CA (US)

(*) Notice: Subject to any disclaimer, the term of this patent is extended or adjusted under 35 U.S.C. 154(b) by 312 days.

(21) Appl. No.: 13/892,750

(22) Filed: May 13, 2013

(65) Prior Publication Data
US 2013/0314415 A1 Nov. 28, 2013

Related U.S. Application Data

(60) Provisional application No. 61/646,603, filed on May 14, 2012.

(51) Int. Cl.
G06T 17/20 (2006.01)
G06T 19/20 (2011.01)

(52) U.S. Cl.
CPC .............. G06T 17/20 (2013.01); G06T 19/20 (2013.01)

(58) Field of Classification Search
CPC . G06T 17/20; G06T 19/20; G06T 2219/2021; G06T 19/00; G06T 9/20; G06T 17/205; G06T 17/00; G06T 2207/20221; G06F 17/50; G06K 9/342
USPC .......................................................... 345/420
See application file for complete search history.

(56) References Cited

U.S. PATENT DOCUMENTS

| 5,886,702 | A | 3/1999 | Migdal et al. |
| 6,169,549 | B1 | 1/2001 | Burr |
| 6,256,039 | B1 | 7/2001 | Krishnamurthy |
| 6,693,631 | B2 | 2/2004 | Hubeli et al. |
| 7,228,191 | B2 * | 6/2007 | Hofmeister et al. ............ 700/98 |
| 2001/0013866 | A1 | 8/2001 | Migdal et al. |
| 2006/0290693 | A1 | 12/2006 | Zhou et al. |
| 2006/0290695 | A1 | 12/2006 | Salomie |
| 2007/0165025 | A1 | 7/2007 | Shen et al. |
| 2009/0177454 | A1 * | 7/2009 | Bronstein ............... G06T 17/20 703/11 |
| 2010/0226589 | A1 | 9/2010 | Mukherjee |
| 2011/0050691 | A1 | 3/2011 | Hamedi et al. |
| 2011/0106507 | A1 * | 5/2011 | Lepage .................. G01V 11/00 703/2 |

(Continued)

OTHER PUBLICATIONS

Sharf et al., SnapPaste: an interactive technique for easy mesh composition, Aug. 25, 2006, Visual Comput (2006) 22: 835-844.*

(Continued)

Primary Examiner — Samantha (Yuehan) Wang
(74) Attorney, Agent, or Firm — Artegis Law Group, LLP

(57) ABSTRACT

One embodiment of the present invention sets forth a technique for joining meshes of primitives. The technique involves receiving a first mesh boundary and a second mesh boundary, removing a first surface associated with the first mesh boundary, and removing a second surface associated with the second mesh boundary. The technique further involves joining a first vertex associated with the first mesh boundary to a first plurality of vertices associated with the second mesh boundary to form a joined surface. Finally, the technique involves performing one or more mesh refinement passes on the joined surface to generate a refined mesh surface.

22 Claims, 11 Drawing Sheets
(5 of 11 Drawing Sheet(s) Filed in Color)

(56) References Cited

U.S. PATENT DOCUMENTS

2012/0120074 A1* 5/2012 Huysmans et al. ........... 345/420
2012/0215510 A1 8/2012 Metaxas

OTHER PUBLICATIONS

Turk et al., Zippered Polygon Meshes from Range Images, SIGGRAPH '94, Jul. 24-29, Orlando, Florida, ACM 1994 ISBN: 0-89791-667-0, p. 1-8.*
Brochu et al, "Efficient Geometrically Exact Continuous Collison Detection", ACM Transactions on Graphics (TOG), vol. 31 No. 4, dated Jul. 1, 2012, New York, US.
Menci et al. Improved Laplacian Smoothing of Noisy Surface Meshes, 1999, Eurographics, vol. 18 (1999), No. 3, pp. 1-8.
Non-Final Office Action for U.S. Appl. No. 13/893,198, dated Sep. 28, 2016, 20 pages.
Non-Final Office Action for U.S. Appl. No. 13/893,191, dated Jul. 7, 2015, 39 pages.
Non-Final Office Action for U.S. Appl. No. 13/893,194, dated Aug. 20, 2015, 19 pages.
Non-Final Office Action for U.S. Appl. No. 13/893,194, dated Oct. 12, 2016, 22 pages.
Bloomenthal et al., Polygonization of Non-Manifold Implicit Surfaces, 1995, SIGGRAPH '95 Proceeding of the 22nd annual conference on Computer Graphic and interactive techniques, pp. 309-316.
Rocchini et al., The Marching Intersections algorithm for merging range images, Mar. 4, 2004, The Visual Computer (2004) 20:149-164, pp. 149-164.
Non-Final Office Action for U.S. Appl. No. 13/893,198, dated Jul. 29, 2015, 20 pages.
Final Office Action for U.S. Appl. No. 13/893,198, dated Dec. 30, 2015, 20 pages.
Andre, Lecture 7—Meshing, 2006, Fluent Inc., p. 1-35.
Non-Final Office Action for U.S. Appl. No. 13/893,191, dated Sep. 28, 2016, 41 pages.
Non-Final Office Action for U.S. Appl. No. 13/893,194, dated Jul. 28, 2015, 16 pages.

* cited by examiner

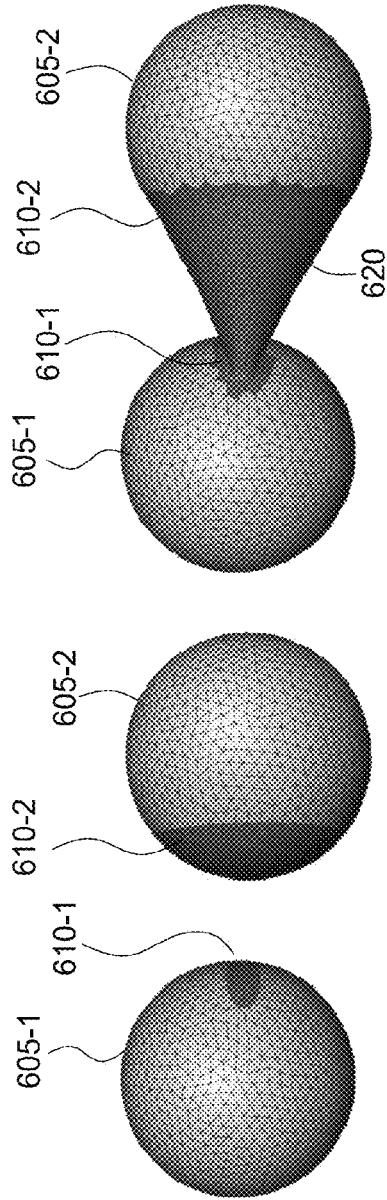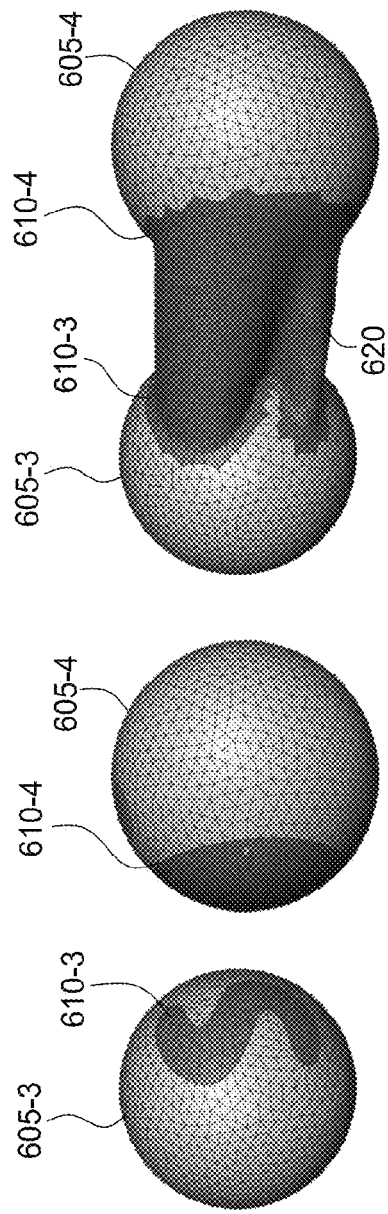
FIG. 6A  FIG. 6B  FIG. 6C  FIG. 6D

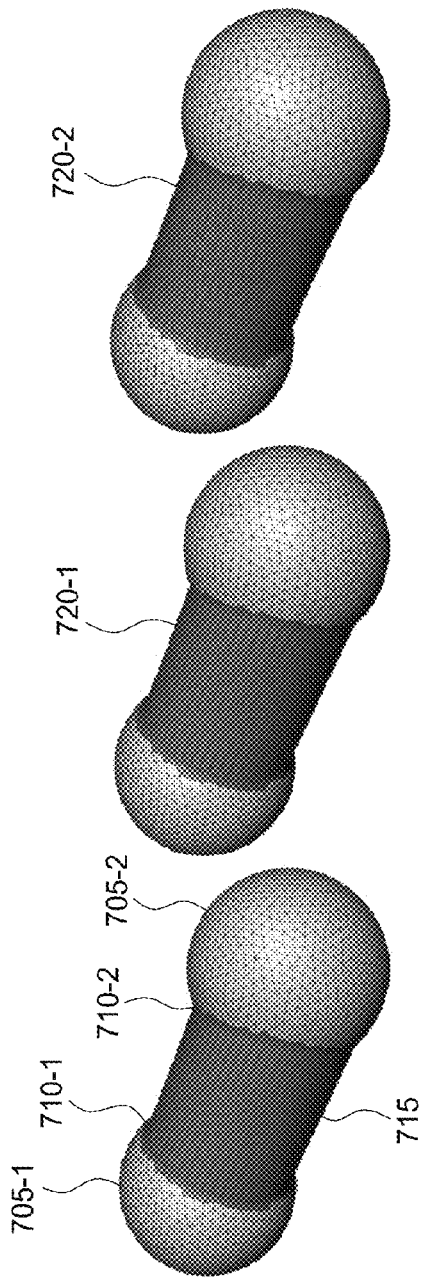
FIG. 7A
FIG. 7B
FIG. 7C
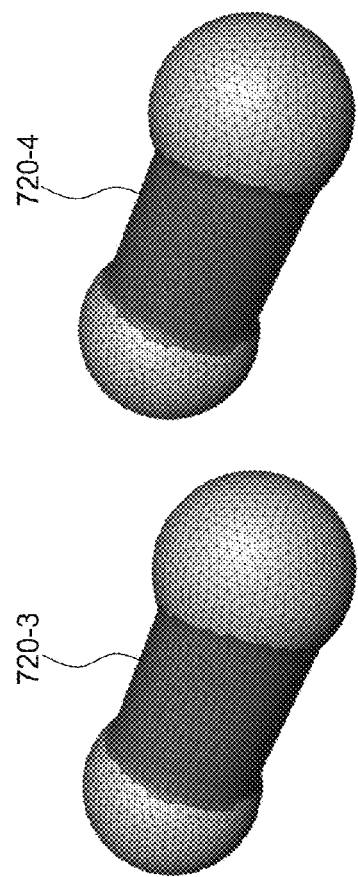
FIG. 7D
FIG. 7E

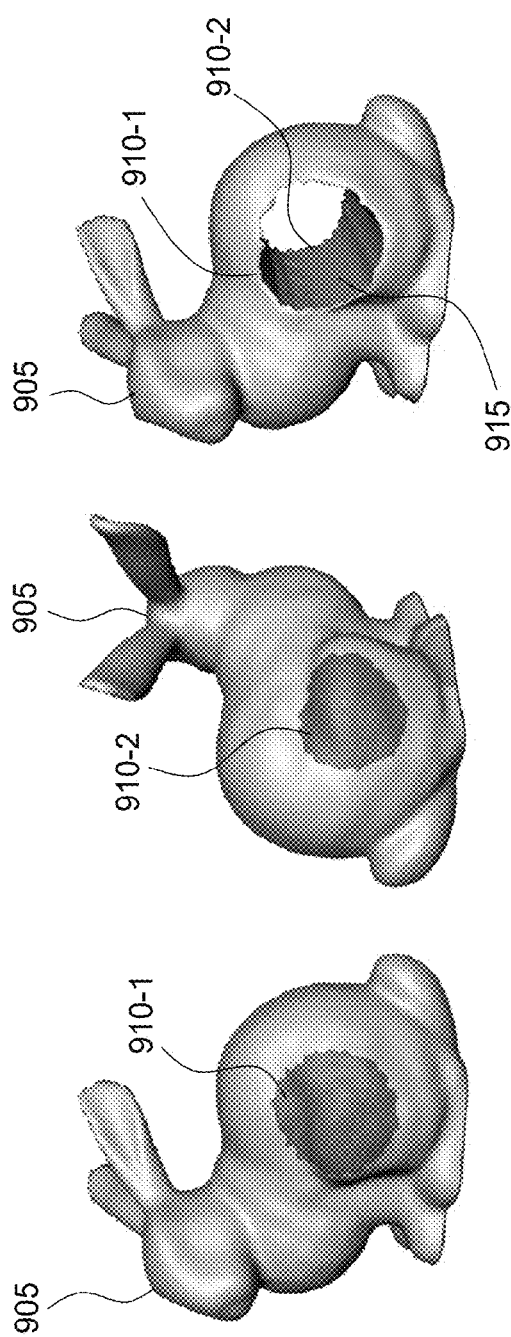

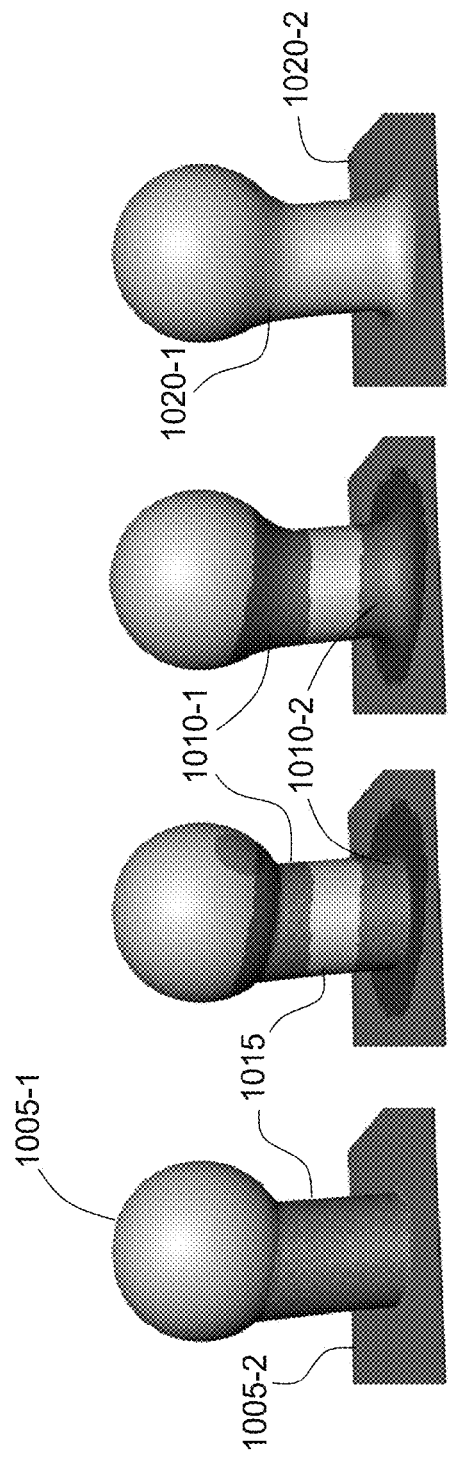

ADAPTIVELY JOINING MESHES

CROSS-REFERENCE TO RELATED APPLICATIONS

This application claims benefit of U.S. Provisional Patent Application Ser. No. 61/646,603, filed May 14, 2012, which is hereby incorporated herein by reference.

BACKGROUND OF THE INVENTION

Field of the Invention

Embodiments of the present invention generally relate to computer-aided design (CAD) and, more specifically, to adaptively joining meshes.

Description of the Related Art

A wide variety of graphics-oriented software applications are currently available to end-users, including computer-aided design (CAD) applications, computer graphics applications, and three-dimensional (3D) modeling applications, among others. Many of these software applications allow an end-user to create and modify 2D and/or 3D graphics designs. For example, an end-user may interact with a 3D modeling application to add geometry to a design, remove geometry from a design, or modify existing geometry. However, conventional 3D modeling applications are unable to satisfactorily perform advanced operations, such as joining two or more designs. Consequently, such operations typically must be performed by manually modifying a mesh of primitives (e.g., triangles) included in the design.

Conventionally, joining two meshes requires the end-user to painstakingly prepare and modify each mesh. For example, joining meshes may require the end-user to manually remove surface(s) at which the meshes are to be joined while at the same time ensuring that the boundaries at which the meshes are to be joined include exactly the same number of vertices. Such preparations are particularly time-consuming when meshes having different triangle and vertex densities are joined. Additionally, after joining the meshes, the user typically must repair mesh distortions and irregularities produced during the joining process. Moreover, even after attempting repairs of mesh distortions, joined regions of the resulting design often include a twisted mesh of irregular triangles having undesirable characteristics (e.g., large opening angles). Further, such irregularities may produce numerical and computational issues and/or produce visual artifacts during subsequent processing of the mesh.

As the foregoing illustrates, there is a need in the art for a more effective way to enable meshes of primitives to be joined together.

SUMMARY OF THE INVENTION

One embodiment of the present invention sets forth a method for joining meshes of primitives. The method involves receiving a first mesh boundary and a second mesh boundary, removing a first surface associated with the first mesh boundary, and removing a second surface associated with the second mesh boundary. The method further involves joining a first vertex associated with the first mesh boundary to a first plurality of vertices associated with the second mesh boundary to form a joined surface. Finally, the method involves performing one or more mesh refinement passes on the joined surface to generate a refined mesh surface.

Further embodiments provide a non-transitory computer-readable medium and a computing device to carry out at least the method steps set forth above.

Advantageously, the disclosed techniques allow a user to join mesh surfaces in a manner that results in fewer mesh distortions and irregularities than prior art approaches. With the disclosed techniques, mesh surfaces associated with separate objects, or mesh surfaces within the same object, may be joined. Further, the user may specify a path along which the surfaces are to be joined. The disclosed techniques, among other things, enable meshes having different triangle and vertex densities to be joined and refined with relatively little pre-processing workload.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided by the Office upon request and payment of the necessary fee.

FIGS. 6A-6D illustrate mesh boundaries joined by refined mesh surfaces, according to one embodiment of the present invention;

FIGS. 7A-7E illustrate a joined surface that was generated between two meshes using the mesh operations engine and iteratively refined using the mesh refinement engine, according to one embodiment of the present invention;

FIGS. 9A-9C illustrate a joined surface extending through an interior volume of a single mesh, according to one embodiment of the present invention;

FIGS. 10A-10D illustrate faired transition regions generated between two meshes and a joined surface, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
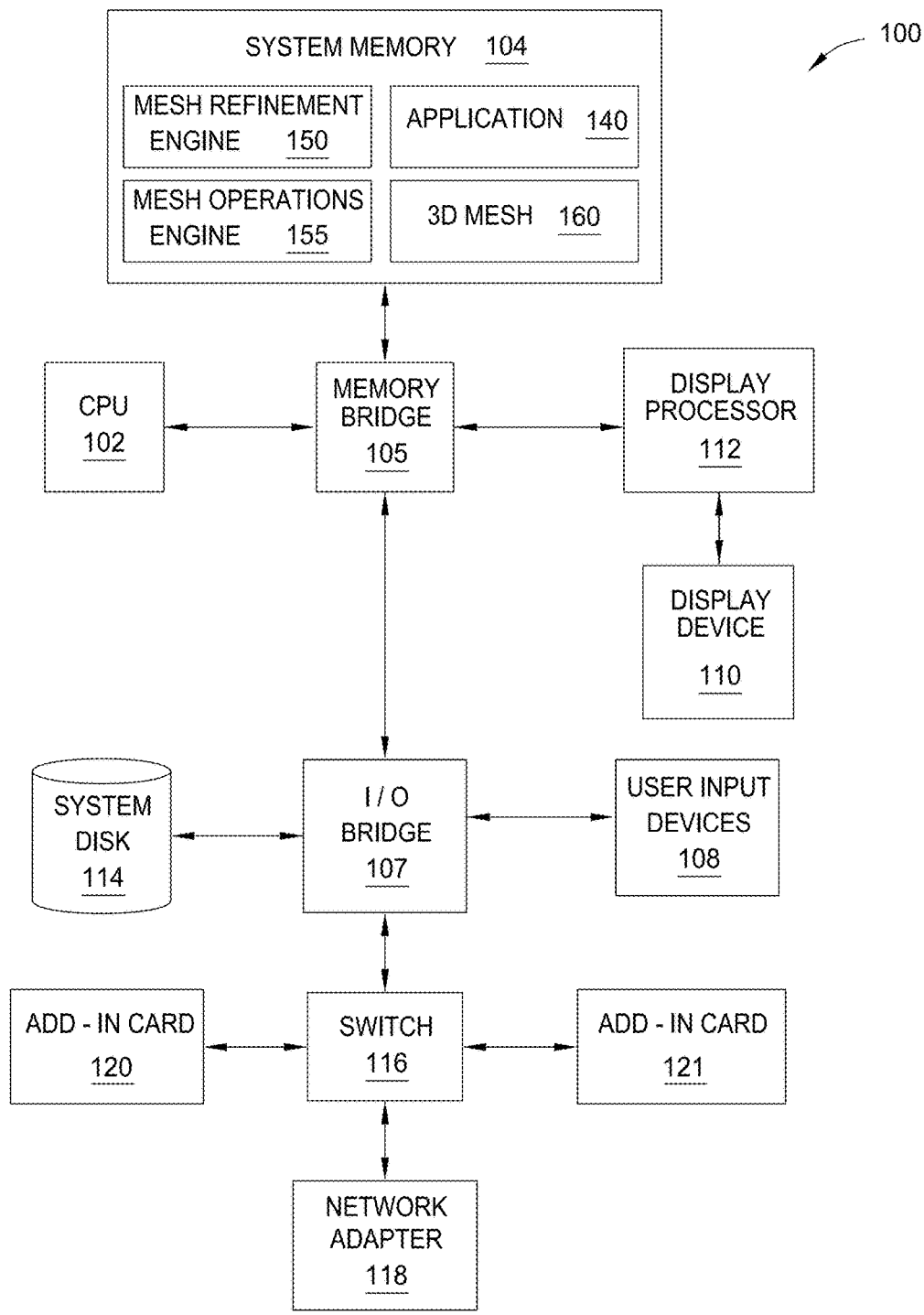
FIG. 1 illustrates a computing device configured to implement one or more aspects of the present invention.

FIG. 1 illustrates a computing device 100 configured to implement one or more aspects of the present invention. As shown, computing device 100 includes a memory bridge 105 that connects a central processing unit (CPU) 102, an input/output (I/O) bridge 107, a system memory 104, and a display processor 112.

Computing device 100 may be a computer workstation, a personal computer, video game console, personal digital assistant, mobile phone, mobile device or any other device suitable for practicing one or more embodiments of the present invention. As shown, the central processing unit (CPU) 102 and the system memory 104 communicate via a bus path that may include a memory bridge 105. CPU 102 includes one or more processing cores, and, in operation, CPU 102 is the master processor of computing device 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

One or more display processors, such as display processor 112, are coupled to memory bridge 105 via a bus or other communication path (e.g., a PCI Express, Accelerated Graphics Port, or HyperTransport link). In one embodiment, display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., conventional cathode ray tube, liquid crystal display, light-emitting diode, plasma, organic light-emitting diode, or surface-conduction electron-emitter based display). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, or other magnetic, optical, or solid state storage devices.

A switch 116 provides connections between I/O bridge 107 and other components such as a network adapter 118 and various add-in cards 120 and 121. Network adapter 118 allows computing device 100 to communicate with other systems via an electronic communications network and may include wired or wireless communication over local area networks and wide area networks, such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computing device 100, via network adapter 118 or system disk 114. The render farm generates one or more rendered images of the scene using the provided instructions and/or data. These rendered images may be stored on computer-readable media in a digital format and optionally returned to computing device 100 for display.

Alternatively, CPU 102 provides display processor 112 with data and/or instructions defining the desired output images, from which display processor 112 generates the pixel data of one or more output images. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

In one embodiment, application 140, mesh refinement engine 150, a mesh operations engine 155, and 3D mesh 160 are stored in system memory 104. Although FIG. 1 shows the mesh refinement engine 150 and mesh operations engine 155 as separate software modules, the mesh refinement engine 150 and mesh operations engine 155 may be part of the same software executable. Additionally, the mesh refinement engine 150 and mesh operations engine 155 may be integrated into the application 140 or offered as software add-ons or plug-ins for the application 140. Application 140 may be a CAD (computer aided design) application program configured to generate and display graphics data included in the 3D mesh 160 on display device 110. For example, the 3D mesh 160 could define one or more graphics objects that represent a 3D model designed using the CAD system or a character for an animation application program.

The mesh refinement engine 150 is configured to modify a mesh (e.g., 3D mesh 160) by performing one or more refinement operations on the mesh. The refinement operations may be applied to add, remove, replace, shift, etc. vertices and/or edges included in the mesh. For example, an edge operation may be performed on the mesh to add an edge (e.g., a triangle edge) to the mesh, remove an edge from the mesh, and/or shift the position of an edge in the mesh. Additionally, a vertex operation may be performed to add a vertex to the mesh, remove a vertex from the mesh, and/or shift the position of a vertex in the mesh. Other types of refinement operations, such as smoothing operations, also may be performed to improve the visual appearance of a mesh.

The mesh refinement engine 150 enables a user to iteratively refine a mesh, for example, by repairing mesh distortions produced when adding geometry to a mesh, removing geometry from a mesh, modifying the geometry of a mesh, and the like. For example, joining regions of a mesh may distort the mesh, producing mesh triangles having irregular sizes and angles near the joined regions. Such irregularities may produce computational issues and/or visual artifacts during subsequent processing of the mesh. However, by performing mesh refinement operations before, during, and/or after the joining process, mesh distortions may be reduced or eliminated.

The mesh operations engine 155 is configured to modify a mesh, for example, by receiving a boundary associated with the mesh and generating primitives (e.g., triangles) along the boundary. In addition, the mesh operations engine 155 may be configured to remove a surface associated with a mesh boundary and then perform a joining operation on the mesh boundary. For example, the mesh operations engine 155 may receive a mesh boundary selected by a user, remove a mesh surface associated with the mesh boundary, and form a joined surface between the mesh boundary and a different region the mesh (or a region of a separate mesh). Further, after generation of a joined surface, the mesh refinement engine 150 may perform one or more refinement operations on the joined surface. The details of various mesh refinement operations are described below with respect to FIGS. 2-5.

Figure 2:
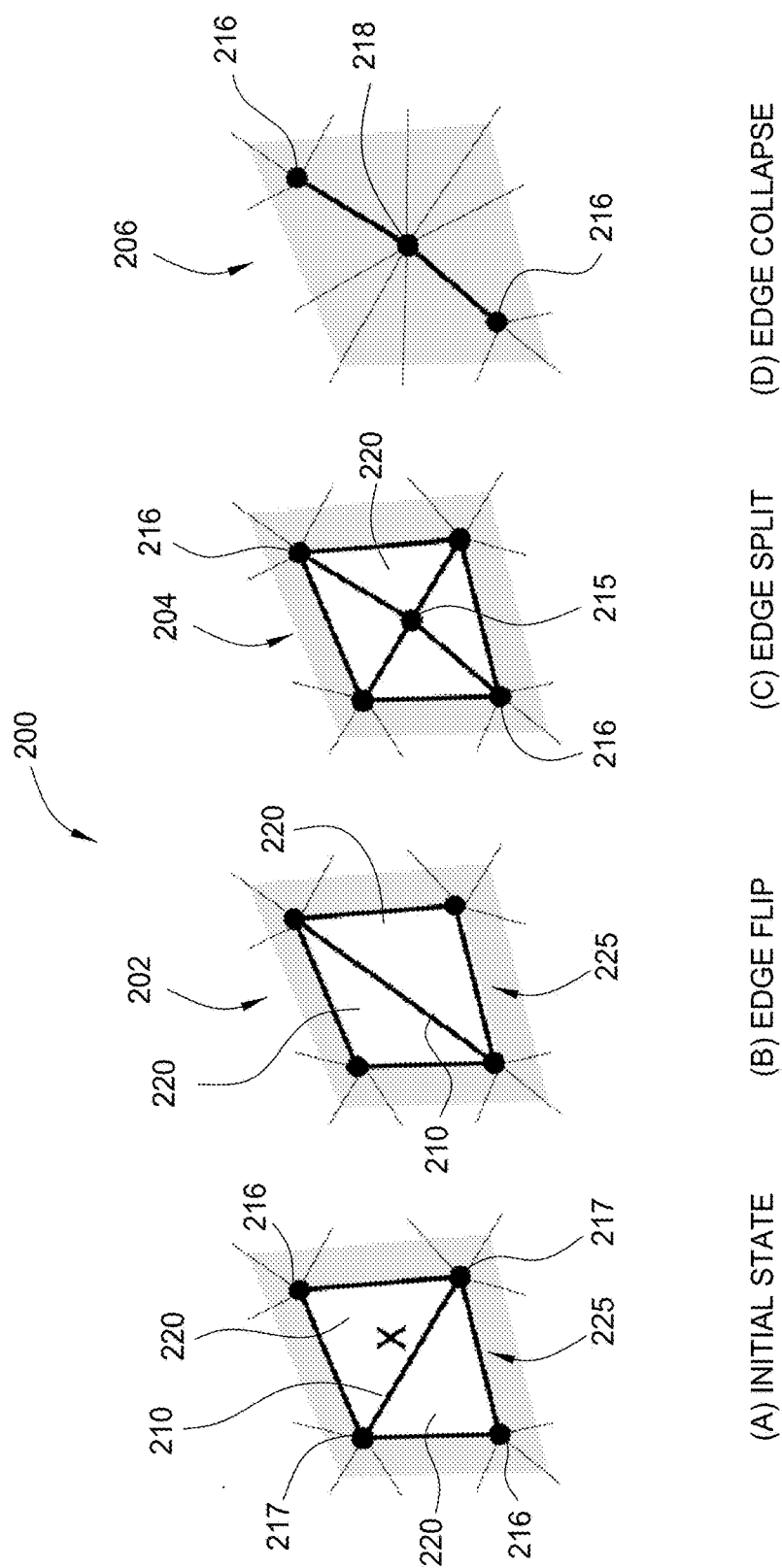
FIG. 2 illustrates edge operations for refining a mesh, according to one embodiment of the present invention.

FIG. 2 illustrates edge operations 200 for refining a mesh, according to one embodiment of the present invention. Edge operations 200 may be performed on a mesh to add an edge, remove an edge, and/or shift the position of an edge. Edge operations 200 may be applied to a mesh on a per-edge basis, or multiple edges may be processed in parallel.

As shown, the edge operations 200 include an edge flip operation 202, an edge split operation 204, and an edge collapse operation 206. An edge flip operation 202 is performed to rotate an edge 210 within the quadrilateral 225 formed by the two triangles 220 connected to the edge 210. An edge split operation 204 is performed to replace the two triangles 220 connected to the edge 210 with four triangles 220 by inserting a vertex 215 into the edge 210 and connecting the vertex 215 to the two vertices 216 opposite the edge 210. An edge collapse operation 206 removes the triangles 220 connected to the edge 210 and shifts the vertices 217 connected to the edge 210 to a new vertex position 218 (e.g., a midpoint of the initial edge 210). Conditions under which these edge operations 200 may be performed are described in further detail below with respect to FIG. 5.

Figure 3:
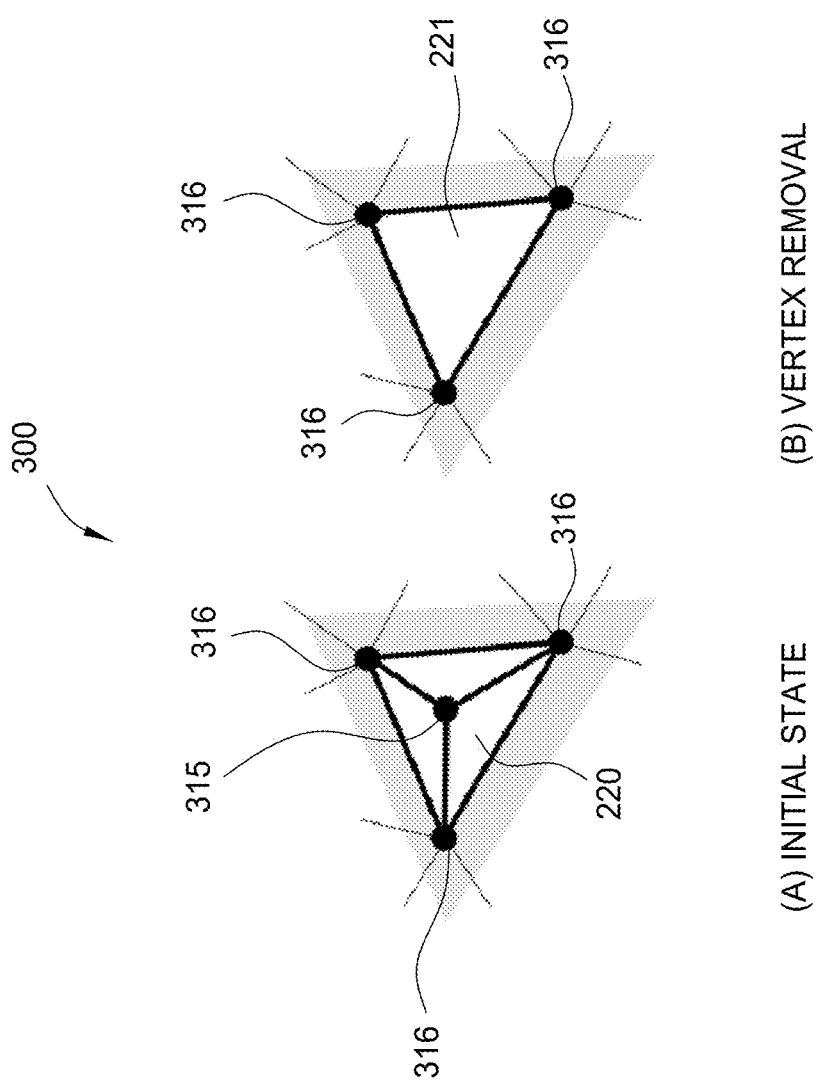
FIG. 3 illustrates a vertex removal operation for refining a mesh, according to one embodiment of the present invention.

FIG. 3 illustrates a vertex removal operation 300 for refining a mesh, according to one embodiment of the present invention. The vertex removal operation 300 may be applied to a mesh on a per-vertex basis, or multiple vertices may be processed in parallel. The vertex removal operation 300 may be performed to remove a vertex 315 connected to only three neighboring vertices 316 (i.e., a vertex 315 having a valence of three), also known as a tip vertex. Tip vertices 315 are necessarily surrounded by triangles 220 having large opening angles and, thus, may cause computational issues during subsequent processing of a mesh. Additionally, tip vertices 315 may collapse into the plane of their surrounding vertices 316 (e.g., when applying smoothing algorithms) and, as a result, may add little or no detail to the mesh. Consequently, to avoid such issues, tip vertices 315 may be removed via a vertex removal operation 300. After removal of a tip vertex 315, a new triangle 221 may be added to the mesh. Conditions under which a vertex removal operation 300 may be performed are described in further detail below with respect to FIG. 5.

Figure 4:
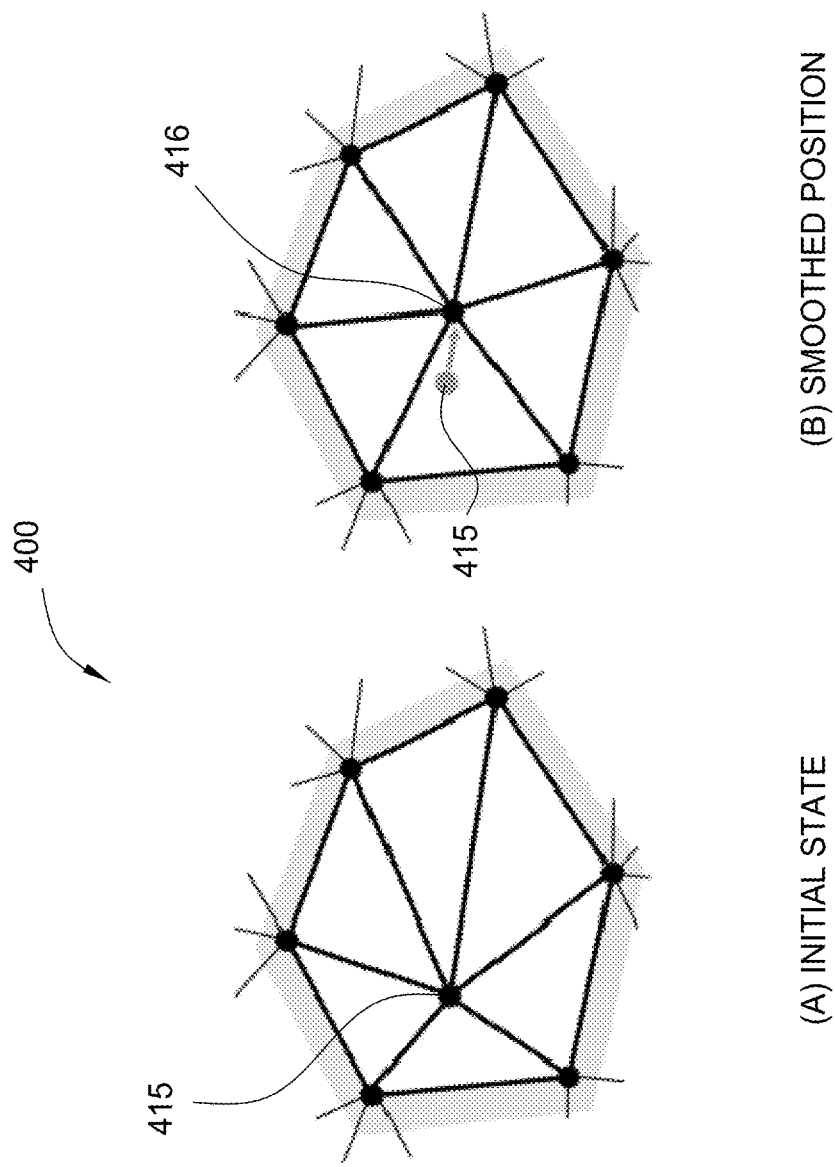
FIG. 4 illustrates a smoothing operation for refining a mesh, according to one embodiment of the present invention.

FIG. 4 illustrates a smoothing operation 400 for refining a mesh, according to one embodiment of the present invention. The smoothing operation 400 may be performed to more evenly distribute vertices in the mesh. In addition to improving the overall visual appearance of the mesh, the smoothing operation may be performed to reduce the number of small, irregularly-sized triangles that occur along mesh boundaries. Such triangles may be generated when edge operations are performed along preserved boundaries.

As shown, the smoothing operation 400 may shift a vertex 415 from an initial position to a smoothed vertex position 416. The location of the smoothed vertex position 416 may be based on a smoothing algorithm (e.g., a Laplacian smoothing algorithm) and a smoothing strength factor. Additional details regarding the smoothing operation 400 are described below with respect to FIG. 5.

Figure 5:
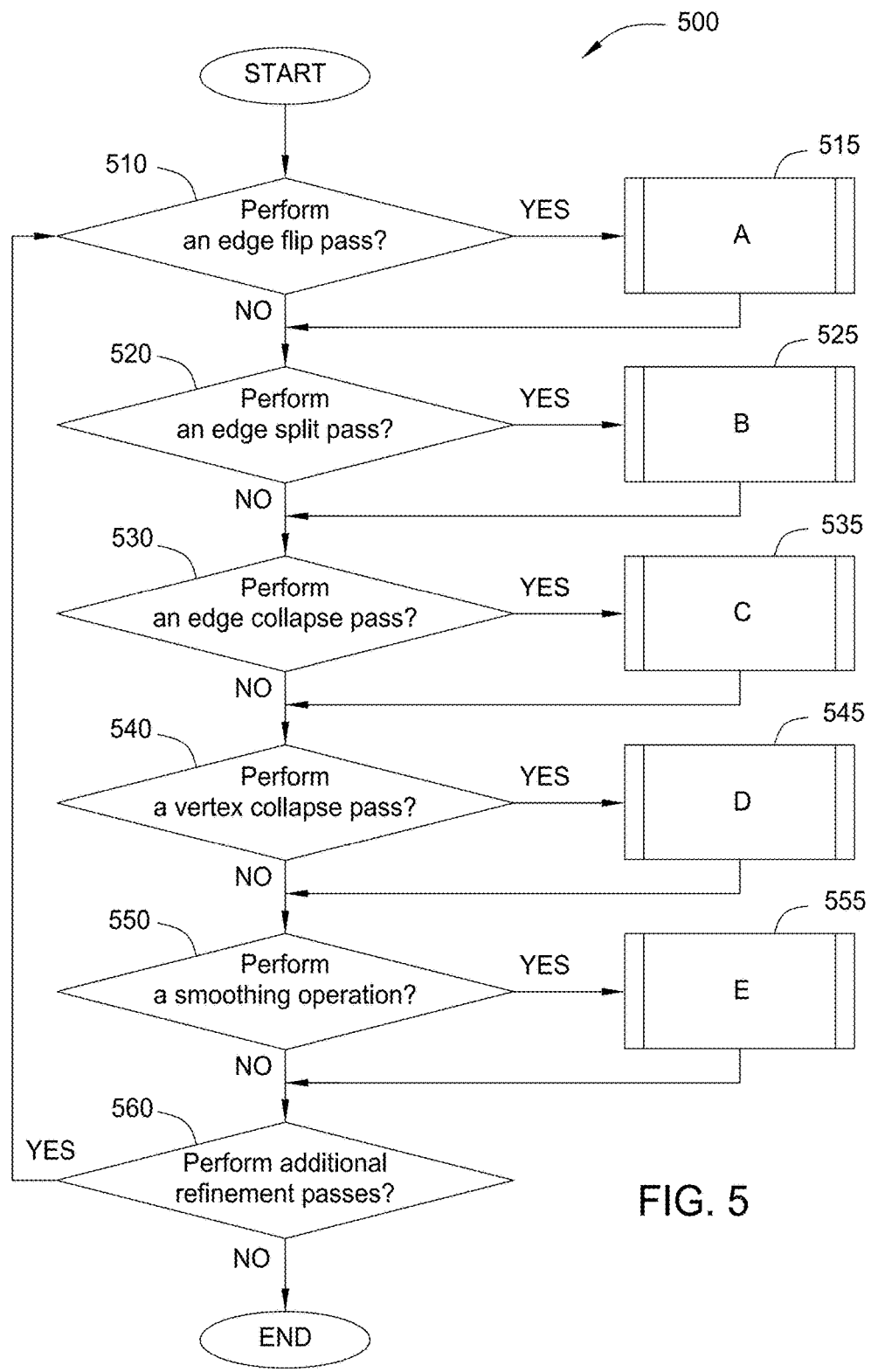
FIG. 5 is a flow diagram of method steps for refining a mesh of primitives, according to one embodiment of the present invention.

FIG. 5 is a flow diagram of method steps for refining a mesh of primitives, according to one embodiment of the present invention. Although the method steps are described in conjunction with the system of FIG. 1, persons skilled in the art will understand that any system configured to perform the method steps, in any order, falls within the scope of the present invention. Further, although mesh refinement operations are described as being performed in a particular order, the mesh refinement operations may be reordered and/or various mesh refinement operations may be repeated or omitted.

As shown, a method 500 begins at step 510, where the mesh refinement engine 150 determines whether to perform an edge flip pass on one or more edges 210 included in a mesh. During the edge flip pass, the mesh refinement engine 150 processes the edge(s) 210 to determine whether an edge flip operation 202 should be performed on the edge(s) 210. If the mesh refinement engine 150 determines that an edge flip pass should be performed, then subprocess A is executed at step 515.

Subprocess A—Edge Flip Operation

Upon executing subprocess A at step 515, the mesh refinement engine 150 identifies a triangle edge 210 included in a mesh. The mesh refinement engine 150 then optionally determines whether the edge 210 is on a preserved boundary of the mesh. A preserved boundary may include a limit (e.g., an outermost perimeter) of the mesh itself and/or a boundary selected by a user or generated by the mesh refinement engine 150. For example, the user may select a region of interest (ROI) in which mesh refinement operations are to be performed. Upon selecting the ROI, the user may further determine whether mesh refinement operations performed within the ROI are permitted to affect regions of the mesh that are outside of the ROI (e.g., in proximity to the ROI). If the mesh refinement operations are permitted to affect regions of the mesh outside of the ROI, then triangles adjacent or proximate to the ROI may be modified when performing mesh refinement operations. If the mesh refinement operations are not permitted to affect regions of the mesh outside of the ROI (i.e., the ROI boundary is a preserved boundary), then the position, shape, etc. of the ROI boundary may be retained, and triangles outside of the ROI are not modified when performing mesh refinement operations. Additionally, the user may pin one or more locations along the ROI boundary to prevent the mesh refinement engine 150 from modifying the position and shape of vertices and triangles at the pinned locations while allowing the mesh refinement engine 150 to modify other (e.g., unpinned) locations along the ROI boundary.

If the edge 210 is located on a preserved boundary (e.g., an ROI boundary, perimeter of the mesh, etc.), then the mesh refinement engine 150 determines not to flip the edge 210. As such, the preserved boundary is not modified. If the edge 210 is not located on a preserved boundary, then the mesh refinement engine 150 determines a potential flipped edge 210. Next, the mesh refinement engine 150 computes the length of the flipped edge 210 and compares this length to the product of a flip threshold $K_{flip}$ and the length of the initial edge 210. The flip threshold $K_{flip}$ is intended to reduce the occurrence of edge flips that do not significantly improve mesh quality. For example, by setting the flip threshold $K_{flip}$ to a value of 0.9, an edge 210 is flipped only if the flipped edge 210 is appreciably shorter than the initial edge 210. Other values for the flip threshold $K_{flip}$ (e.g., 0.95, 0.8, 0.75, etc.) may be selected as well.

If the length of the flipped edge 210 is greater than the product of the flip threshold $K_{flip}$ and the length of the initial edge 210, then the mesh refinement engine 150 determines not to flip the edge 210. If the length of the flipped edge 210 is not greater than the product of the flip threshold $K_{flip}$ and the length of the initial edge 210, then the mesh refinement engine 150 next determines a distance between the midpoint of the initial edge 210 and the midpoint of the flipped edge 210. The distance is then compared to the product of the midpoint threshold $K_{midpoint}$ and the length of the initial edge 210. The midpoint threshold $K_{midpoint}$ is intended to reduce the occurrence of edge flips that significantly change the shape of the mesh. For example, by setting the midpoint threshold $K_{midpoint}$ to a value of 0.2, an edge 210 is flipped only if the flipped edge 210 is in a plane that is near the plane in which the initial edge 210 resides. Other values for the midpoint threshold $K_{midpoint}$ (e.g., 0.1, 0.3, etc.) may be selected as well.

If the distance is greater than the product of the midpoint threshold $K_{midpoint}$ and the length of the initial edge 210, then the mesh refinement engine 150 determines not to flip the edge 210. If the distance is not greater than the product of the midpoint threshold $K_{midpoint}$ and the length of the initial edge 210, then the mesh refinement engine 150 next determines whether flipping the edge 210 would create a non-manifold edge. A non-manifold edge may be defined as an edge that is shared by more than two faces (e.g., an edge shared by more than two triangles). If flipping the edge 210 would create a non-manifold edge, then the mesh refinement engine 150 determines not to flip the edge 210. If flipping the edge 210 would not create a non-manifold edge, then the mesh refinement engine 150 flips the edge 210. Finally, the mesh refinement engine 150 determines whether to process another edge 210 included in the mesh. If another edge 210 is to be processed by the mesh refinement engine 150, then the mesh refinement engine 150 identifies another edge 210 included in the mesh and repeats the process described above. If no additional edges 210 are to be processed, then subprocess A ends, and the method proceeds to step 520.

At step 520, the mesh refinement engine 150 determines whether to perform an edge split pass on one or more edges 210 included in a mesh (e.g., to determine whether an edge split operation 204 should be performed on the edge(s) 210). If the mesh refinement engine 150 determines that an edge split pass should be performed, then subprocess B is executed at step 525.

Subprocess B—Edge Split Operation

Upon executing subprocess B at step 525, the mesh refinement engine 150 identifies a triangle edge 210 included in a mesh. The mesh refinement engine 150 then optionally determines whether the edge 210 is on a preserved boundary of the mesh. If the edge 210 is located on a preserved boundary (e.g., an ROI boundary, perimeter of the mesh, etc.), then the mesh refinement engine 150 determines not to split the edge 210. If the edge 210 is not located on a preserved boundary, then the mesh refinement engine 150 compares a weighted length of the edge 210 to a split threshold $K_{split}$. The split threshold split threshold $K_{split}$ may be defined as the target maximum edge length. That is, by performing this comparison, at the end of an edge split pass, all processed edges 210 may be shorter than the split threshold $K_{split}$ length.

The weighting applied to the length of the edge 210 may be based on the per-vertex refinement weights assigned to the two vertices 217 to which the edge 210 is connected. The per-vertex refinement weights may be assigned to vertices by the mesh refinement engine 150, or the per-vertex refinement weights may be based on user selection (e.g., based on a weight refinement mask). In general, refinement weights assigned to vertices, edges, etc. may control the conditions under which a refinement operation is performed. For example, assigning a higher weighting to a vertex may increase the likelihood that a refinement operation will be performed on the vertex (e.g., a vertex collapse operation 300) or on an edge associated with the vertex (e.g., an edge split operation 204). Conversely, assigning a lower weighting to a vertex may decrease the likelihood that a refinement operation will be performed on the vertex or on an edge associated with the vertex. Further, assigning a zero weighting to a vertex may indicate that a refinement operation will not be performed on the vertex or on an edge associated with the vertex.

If the weighted length of the edge 210 is not greater than the split threshold $K_{split}$, then the mesh refinement engine 150 determines not to split the edge 210. If the weighted length of the edge 210 is greater than the split threshold $K_{split}$, then the mesh refinement engine 150 adds the edge 210 to a split edge list. Next, the mesh refinement engine 150 determines whether to process another edge 210 included in the mesh. If another edge 210 is to be processed by the mesh refinement engine 150, then another edge 210 included in the mesh is identified, and the process described above is repeated. If no additional edges 210 are to be processed, then the edge(s) 210 included in the split edge list are optionally sorted by length. Finally, the edge(s) 210 included in the split edge list are split. If the edges 210 were sorted, then the edges 210 included in the split edge list may be split in order of longest edge length to shortest edge length. Once all edges on the split edge list have been split, subprocess B ends, and the method proceeds to step 530.

At step 530, the mesh refinement engine 150 determines whether to perform an edge collapse pass on one or more edges 210 included in a mesh (e.g., to determine whether an edge collapse operation 206 should be performed on the edge(s) 210). If the mesh refinement engine 150 determines that an edge collapse pass should be performed, then subprocess C is executed at step 535.

Subprocess C—Edge Collapse Operation

Upon executing subprocess C at step 535, the mesh refinement engine 150 identifies a triangle edge 210 included in a mesh. The mesh refinement engine 150 then optionally determines whether the edge 210 is on a preserved boundary of the mesh. If the edge 210 is located on a preserved boundary (e.g., an ROI boundary, perimeter of the mesh, etc.), then the mesh refinement engine 150 determines not to collapse the edge 210. If the edge 210 is not located on a preserved boundary, then the mesh refinement engine 150 next determines whether at least one of two inequalities are satisfied. With reference to the first inequality, the mesh refinement engine 150 determines whether a weighted length (e.g., based on per-vertex refinement weights described above) of the edge 210 is greater than a collapse threshold $K_{collapse}$. The collapse threshold $K_{collapse}$ is intended to collapse edges 210 that are shorter than the value assigned to this threshold. With reference to the second inequality, the mesh refinement engine 150 determines whether a minimum opposing angle of one of the two triangles connected to the edge 210 is less than a target angle $T_{collapse}$. The target angle $T_{collapse}$ is intended to collapse triangles 220 having an angle that is less than the value assigned to this target. Thus, after an edge collapse pass, all angles included in the processed triangles 220 may be greater than the target angle $T_{collapse}$. Furthermore, because this criterion is scale-independent (e.g., the target angle $T_{collapse}$ does not depend on the relative size of triangles in the mesh), mesh quality may be significantly improved even if $K_{collapse}$ is assigned an inappropriate value.

If one or both of the first inequality and second inequality are satisfied, the mesh refinement engine 150 then determines whether collapsing the edge 210 would create a non-manifold edge. If collapsing the edge 210 would create a non-manifold edge, then the mesh refinement engine 150 determines not to collapse the edge 210. If collapsing the edge 210 would not create a non-manifold edge, then the mesh refinement engine 150 collapses the edge 210. Finally, the mesh refinement engine 150 determines whether to process another edge 210 included in the mesh. If another edge 210 is to be processed by the mesh refinement engine 150, then another edge 210 included in the mesh is identified, and the process described above is repeated. If no additional edges 210 are to be processed, then subprocess C ends, and the method proceeds to step 540.

At step 540, the mesh refinement engine 150 determines whether to perform a vertex collapse pass on one or more vertices 315 included in a mesh (e.g., to determine whether a vertex collapse operation 300 should be performed on the vertices 315). If the mesh refinement engine 150 determines that a vertex collapse pass should be performed, then subprocess D is executed at step 545.

Subprocess D—Vertex Collapse Operation

Upon executing subprocess D at step 545, the mesh refinement engine 150 identifies a triangle vertex 315 included in a mesh. The mesh refinement engine 150 then optionally determines whether the vertex 315 is on a preserved boundary of the mesh. If the vertex 315 is located on a preserved boundary (e.g., an ROI boundary, perimeter of the mesh, etc.), then the mesh refinement engine 150 determines not to collapse the vertex 315. If the vertex 315 is not located on a preserved boundary, then the mesh refinement engine 150 determines whether the vertex 315 has a valence equal to three (i.e., the vertex 315 is connected to only three neighboring vertices 316). If the vertex 315 does not have a valence equal to three, then the vertex 315 is not collapsed.

If the vertex 315 has a valence equal to three, then the mesh refinement engine 150 optionally determines whether all triangles connected to the vertex 315 are located within the ROI. If all triangles connected to the vertex 315 are not located within the ROI, then the vertex 315 is not collapsed. If all triangles connected to the vertex 315 are located within the ROI, then the mesh refinement engine 150 next determines whether a neighboring vertex 316 has a valence higher than three. If no neighboring vertex 316 has a valence higher than three, then the vertex 315 is not collapsed. If a neighboring vertex 316 has a valence higher than three, then the vertex 315 is collapsed and a new triangle 221 is added to the mesh. Finally, the mesh refinement engine 150 determines whether to process another vertex 315 included in the mesh. If another vertex 315 is to be processed by the mesh refinement engine 150, then another vertex 315 included in the mesh is identified, and the process described above is repeated. If no additional vertices 315 are to be processed, then subprocess D ends, and the method proceeds to step 550.

At step 550, the mesh refinement engine 150 determines whether to perform a smoothing operation 400 on one or more vertices 415 included in a mesh. If the mesh refinement engine 150 determines that a smoothing operation 400 should be performed, then subprocess E is executed at step 555.

Subprocess E—Smoothing Operation

Upon executing subprocess E at step 555, the mesh refinement engine 150 identifies a triangle vertex 415 included in a mesh. The mesh refinement engine 150 then determines a smoothed vertex position 416. The smoothed vertex position 416 may be determined using a smoothing algorithm, such as a uniform Laplacian smoothing algorithm. Next, a smoothing weight may be determined based on a strength factor and/or a weight function value. The strength factor may be a user-defined value (e.g., a brush tool parameter in application 140). The weight function value may be based on a weight mask generated by the mesh refinement engine 150 or defined by the user.

Next, a weighted vertex position is determined based on the smoothed vertex position 416 and (optionally) based on the smoothing weight. For example, the weighted vertex position may be computed by interpolating the initial vertex position 415 and the smoothed vertex position 416 or by performing linear blending using the initial vertex position 415 (V), the smoothed vertex position 416 (V'), and the smoothing weight (WS). An exemplary formula for performing linear blending to determine a weighted vertex position (V″) is provided in Equation 1, below.

$$V''=(1-WS)\times V+(WS)\times V' \quad \text{(Eq. 1)}$$

Finally, at step 560, the mesh refinement engine 150 determines whether to perform additional mesh refinement passes. If the mesh refinement engine 150 determines that additional refinement passes should be performed, then the method returns to step 510, as previously described herein. Alternatively, upon determining that additional refinement passes should be performed, the method may return to any of step 510, step 520, step 530, step 540, and/or step 550, as also previously described herein. Furthermore, the flow diagram may be traversed such that one or more of the edge operations 200 are performed before and/or after the vertex collapse operation 300 and/or the smoothing operation 400. If the mesh refinement engine 150 determines that additional refinement passes should not be performed, then the method ends.

In addition to repairing mesh distortions and irregularities, the mesh refinement engine 150 enables a user to perform other types of mesh operations. For example, when used in conjunction with the mesh operations engine 155, the mesh refinement engine 150 enables a user to join two or more meshes in a manner that requires relatively little pre-processing workload. Such techniques are described below in further detail.

Adaptively Joining Meshes

FIGS. 6A-6D illustrate mesh boundaries 610 joined by refined mesh surfaces 620, according to one embodiment of the present invention. As shown, a user may select mesh boundaries 610 (e.g., 610-1, 610-2, etc.) on one or more 3D meshes 605 (e.g., 605-1, 605-2, etc.), and a joined surface is generated between the mesh boundaries 610 by the mesh operations engine 155. Additionally, the joined surface may be refined by the mesh refinement engine 150 to generate the refined mesh surfaces 620 (e.g., 620-1 and 620-2) illustrated in FIGS. 6B and 6D. By using the mesh refinement engine 150 to iteratively refine meshes during and/or after the joining process, high-quality joined surfaces 620 may be generated between mesh boundaries 610 having dissimilar shapes, sizes, and vertex densities with little pre-processing workload. Additional details regarding the generation and iterative refinement of joined surfaces are provided below.

FIGS. 7A-7E illustrate a joined surface that was generated between two meshes 705 using the mesh operations engine 155 and iteratively refined using the mesh refinement engine 150, according to one embodiment of the present invention. As described above, the mesh operations engine 155 may generate an initial joined surface (e.g., joined surface 715) between two (or more) mesh boundaries 710 (e.g., 710-1 and 710-2). The joined surface 715 may then be processed by the mesh refinement engine 150. During processing, the mesh refinement engine 150 may perform one or more edge operations, vertex operations, and/or smoothing operations (see, e.g., FIGS. 2-5) on the joined surface 715 to generate a refined mesh surface 720, as shown in FIGS. 7B-7E.

Generation of an initial joined surface may include removing the mesh boundaries 710 associated with the mesh(es) to be joined. A vertex associated with a first mesh boundary (e.g., 710-1) is then joined to one or more vertices associated with a second mesh boundary (e.g., 710-2). For example, as shown in FIG. 7A, generation of the initial joined surface may include joining each vertex on mesh boundary 710-1 to two vertices on mesh boundary 710-2 with a triangle. Additionally, each vertex on mesh boundary 710-2 may be joined to two vertices on mesh boundary 710-1 with a triangle.

Once each vertex on the first mesh boundary 710-1 has been joined to one or more vertices on the second mesh boundary 710-2, the mesh refinement engine 150 may perform one or more refinement passes on the initial joined surface. For example, an edge split operation 204 may be performed on a plurality of edges 210 included in the joined surface 715 to generate the refined mesh surface 720-1 shown in FIG. 7B. Additional refinement iterations (e.g., additional edge split passes) may further refine the surface joining the mesh boundaries 710, producing the refined mesh surfaces 720-2 and 720-3 shown in FIGS. 7C and 7D, respectively. Additionally, other types of edge operations 200 (e.g., an edge flip operation 202 and/or an edge collapse operation 206) as well as a vertex collapse operation 300 and/or a smoothing operation 400 may be performed on the edges and vertices included in the surface joining the mesh boundaries 710 to further refine the mesh surface, as shown in FIG. 7E.

A user may specify a path along which the joined surface 715 and/or refined mesh surface 720 is to be generated. The mesh operation engine 155 and/or mesh refinement engine 150 may then modify the shape of the joined surface 715 and/or refined mesh surface 720 based on the user-defined path. For example, if the user defines a curved path (e.g., between the first mesh boundary 710-1 and the second mesh boundary 710-2), the refined mesh surface 720 may extend along a curved path between the meshes 705-1 and 705-2. Additionally, the user may specify other characteristics of the refined mesh surface 720, such as a radius and shape, at one or more locations along the refined mesh surface 720.

Figure 8A:
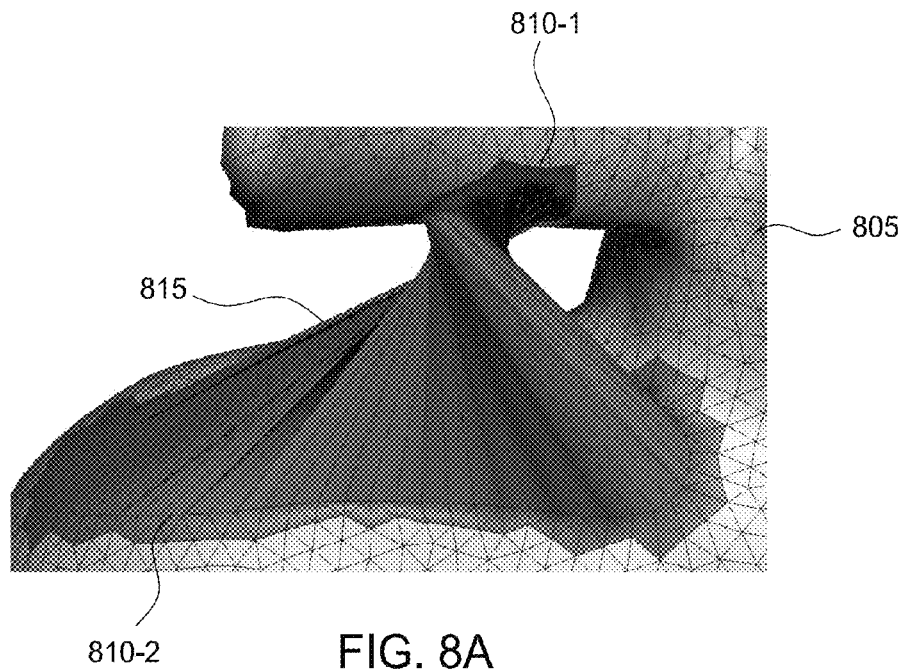
FIGS. 8A and 8B illustrate mesh surfaces extending between mesh boundaries having different sizes and vertex counts, according to one embodiment of the present invention.
Figure 8B:
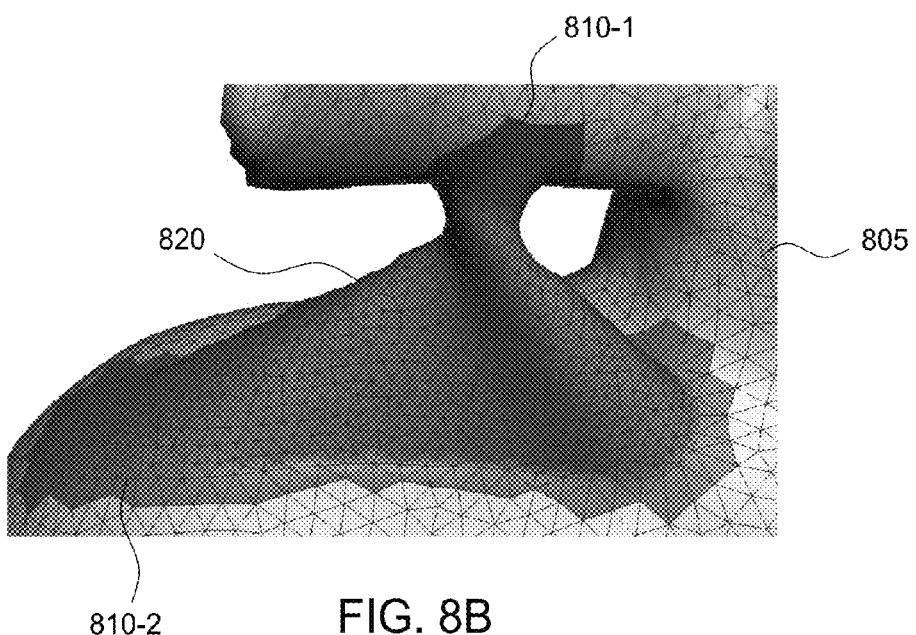

FIGS. 8A and 8B illustrate mesh surfaces extending between mesh boundaries 810 having different sizes and vertex counts, according to one embodiment of the present invention. In contrast to the joined surface 715 shown in FIG. 7A, the joined surface 815 shown in FIG. 8A is generated between a first mesh boundary 810-1 of a mesh 805 that includes fewer vertices than a second mesh boundary 810-2 of the mesh 805. Accordingly, when generating the initial joined surface, the mesh operations engine 155 may join each vertex associated with the first mesh boundary 810-1 to two or more vertices associated with the second mesh boundary 810-2. Additionally, the mesh operations engine 155 may join each vertex associated with the second mesh boundary 810-2 to two or more vertices associated with the first mesh boundary 810-1. For example, as shown, a single vertex associated with the first mesh boundary 810-1 may be joined to five or more vertices associated with the second mesh boundary 810-2.

After generation of the initial joining surface, the resulting mesh may include triangles having irregular shapes and sizes. For example, connecting a single vertex on a first mesh boundary to five or more vertices on a second mesh boundary may produce a plurality of thin, twisted triangles. However, by performing one or more refinement operations with the mesh refinement engine 150, a refined mesh surface 820 that includes triangles having regular sizes and shapes may be generated, as shown in FIG. 8B. Thus, by using the mesh refinement engine 150 in conjunction with the mesh operations engine 155, a user is able to generate high-quality refined mesh surfaces between mesh boundaries having different sizes and vertex counts.

In addition to generating exterior joined surfaces (e.g., 815) between regions of a mesh, the mesh operation engine 155 also may generate interior joined surfaces between two or more boundaries of the same mesh (or separate meshes). Such an implementation is shown in FIGS. 9A-9C, which illustrate a joined surface 915 extending through an interior volume of a single mesh 905, according to one embodiment of the present invention. In contrast to the joined surface 815 shown in FIG. 8A, the joined surface 915 shown in FIG. 9C is generated between a first mesh boundary 910-1 and a second mesh boundary 910-2 such that the joined surface 915 extends through an interior volume of the mesh 905. An interior joined surface 915 may be generated in a manner that is the same as or similar to the manner in which an exterior joined surface is generated (e.g., by removing mesh surface, joining vertices, etc.).

FIGS. 10A-10D illustrate faired transition regions 1020-1, 1020-2 generated between two meshes 1005-1, 1005-2 and a joined surface 1015, according to one embodiment of the present invention. After (or during) the generation of a joined surface, a faired transition may be generated between one or more of the mesh boundaries and the joined surface. The faired transition regions may be generated by applying one or more refinement operations (e.g., edge collapse operation 206, vertex collapse operations 300, smoothing operations 400, etc.) until a smooth transition extends between the joined surface 1015 and a mesh 1005. For example, in FIG. 10B, a first transition boundary 1010-1 has been selected between a first mesh 1005-1 and the joined surface 1015, and a second transition boundary 1010-2 has been selected between a second mesh 1005-2 and the joined surface 1015. Multiple mesh refinement passes were then performed to generate a first faired transition region 1020-1 between the first mesh 1005-1 and the joined surface 1015 and a second faired transition region 1020-2 between the second mesh 1005-2 and the joined surface 1015. The smoothness of a faired transition region 1020 can be controlled by the user, for example, by enabling the user to iteratively apply mesh refinement operations using the mesh refinement engine 150. The results are shown in FIG. 10D.

Figure 11:
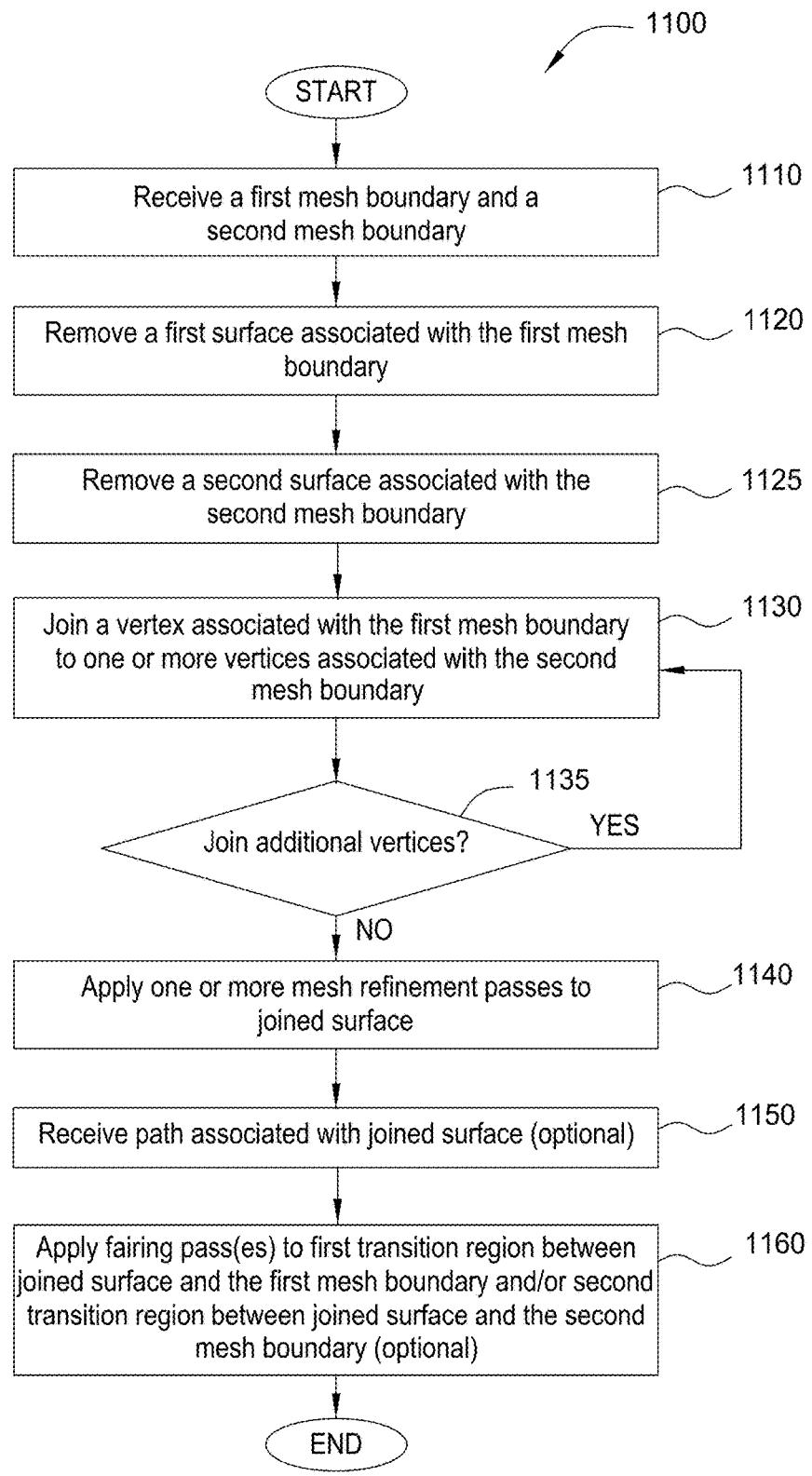
FIG. 11 is a flow diagram of method steps for joining meshes of primitives, according to one embodiment of the present invention.

FIG. 11 is a flow diagram of method steps for joining meshes of primitives, according to one embodiment of the present invention. Although the method steps are described in conjunction with the system of FIG. 1, persons skilled in the art will understand that any system configured to perform the method steps, in any order, falls within the scope of the present invention. Further, although the method steps are described as joining two separate meshes of primitives, the method steps also may be implemented to join mesh boundaries associated with a single mesh of primitives.

As shown, a method 1100 begins at step 1110, where the mesh operations engine 155 receives a first mesh boundary (e.g., associated with a first mesh) and a second mesh boundary (e.g., associated with a second mesh). The mesh boundaries received by the mesh operations engine 155 may be based on user selection. A user may define mesh boundaries 610 to be joined by the mesh operations engine 155 by selecting a plurality of mesh triangles on which the mesh boundary is to be based. For example, a user may select one or more mesh triangles that form the perimeter of a mesh boundary 610 to be joined. Alternatively, a user may draw a design on a mesh, and the mesh operations engine 155 may generate a mesh boundary 610 based on the design. In another example, a boundary loop associated with the edge of a mesh (e.g., a hole in the mesh) may be selected by the user as a mesh boundary to be joined.

At step 1120, the mesh operations engine 155 removes a first surface associated with the first mesh boundary. At step 1125, the mesh operations engine 155 removes a second surface associated with the second mesh boundary. Next, at step 1130, a vertex associated with the first mesh boundary is joined to one or more vertices associated with the second mesh boundary. For example, a vertex associated with the first mesh boundary may be joined to a plurality of vertices associated with the second mesh boundary (e.g., 3 or more vertices associated with the second mesh boundary).

At step 1135, the mesh operations engine 155 determines whether additional vertices are to be joined. If additional vertices are to be joined, the method returns to step 1130. If no additional vertices are to be joined (e.g., all vertices on the first boundary and second boundary have been joined), the method proceeds to step 1140, where the mesh refinement engine 150 may perform one or more mesh refinement passes on the joined surface to generate a refined mesh surface.

At step 1150, a user-defined path may be received by the mesh refinement engine 150 and/or mesh operations engine 155. The user-defined path may specify a shape or size to which the joined surface or refined mesh surface is to be fitted. For example, a curved path may be received, and, in response, the mesh refinement engine 150 and/or mesh operations engine 155 may shape the joined surface or refined mesh surface based on the curved path. Alternatively, receipt of a user-defined path may occur prior to joining vertices at step 1130 and/or prior to applying mesh refinement passes at step 1140. Finally, at step 1160, one or more transition boundaries may be selected, and one or more mesh refinement passes may be performed to generate a faired transition between the mesh(es) and the refined mesh surface.

In sum, a mesh operations engine receives a selection of a first boundary associated with a first mesh surface and a selection of a second boundary associated with a second mesh surface. The mesh operations engine then joins each vertex of the first boundary to one or more vertices of the second boundary to generate a joined surface. A mesh refinement engine may further perform one or more edge operator passes, vertex collapse passes, and/or smoothing passes prior to, during, and/or after joining process.

One advantage of the techniques described herein is that a user is able to join mesh surfaces in a manner that results in fewer mesh distortions and irregularities than prior art approaches. With the disclosed techniques, mesh surfaces associated with separate objects, or mesh surfaces within the same object, may be joined. Further, the user may specify a path along which the surfaces are to be joined. The disclosed techniques, among other things, enable meshes having different triangle and vertex densities to be joined and refined with relatively little pre-processing workload.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for joining meshes of primitives, the method comprising:
 receiving a first mesh boundary and a second mesh boundary;
 removing a first surface associated with the first mesh boundary;
 removing a second surface associated with the second mesh boundary;
 in response to removing the first surface and the second surface, adding at least a first edge that joins a first vertex of the first mesh boundary that is located along an edge of the removed first surface with a first plurality of vertices of the second mesh boundary that are located along an edge of the removed second surface,
  wherein adding the at least first edge creates a first portion of a joined surface that joins the first mesh boundary and the second mesh boundary, and
  wherein the first portion of the joined surface joins the first vertex of the first mesh boundary and the first plurality of vertices of the second mesh boundary; and
 performing one or more mesh refinement passes on the joined surface to generate a refined mesh surface.

2. The method of claim 1, wherein the joined surface comprises a plurality of mesh triangles.

3. The method of claim 1, wherein the first mesh boundary includes a first number of vertices, the second mesh boundary includes a second number of vertices, and the first number of vertices does not equal the second number of vertices.

4. The method of claim 1, wherein receiving the first mesh boundary comprises receiving first user input selecting a first plurality of mesh triangles, and receiving the second mesh boundary comprises receiving second user input selecting a second plurality of mesh triangles.

5. The method of claim 1, further comprising:
 receiving a user-defined path; and
 shaping the joined surface based on the user-defined path.

6. The method of claim 5, wherein shaping comprises performing the one or more mesh refinement passes on the joined surface.

7. The method of claim 1, further comprising joining a second vertex associated with the second mesh boundary to a second plurality of vertices associated with the first mesh boundary to form a second portion of the joined surface.

8. The method of claim 1, wherein performing the one or more mesh refinement passes comprises:
 identifying a triangle associated with the joined surface;
 selecting an edge associated with the triangle;
 performing an edge flip pass on the edge;
 performing an edge split pass on the edge; and
 performing an edge collapse pass on the edge.

9. The method of claim 1, wherein performing the one or more mesh refinement passes generates a first faired transition region between the joined surface and the first mesh boundary and a second faired transition region between the joined surface and the second mesh boundary.

10. A non-transitory computer-readable storage medium including instructions that, when executed by a processor, cause the processor to join meshes of primitives, by performing the steps of:
 receiving a first mesh boundary and a second mesh boundary;
 removing a first surface associated with the first mesh boundary;
 removing a second surface associated with the second mesh boundary;
 in response to removing the first surface and the second surface, adding at least a first edge that joins a first vertex of the first mesh boundary that is located along an edge of the removed first surface with a first plurality of vertices of the second mesh boundary that are located along an edge of the removed second surface,
  wherein adding the at least first edge creates a first portion of a joined surface that joins the first mesh boundary and the second mesh boundary, and
  wherein the first portion of the joined surface joins the first vertex of the first mesh boundary and the first plurality of vertices of the second mesh boundary; and
 performing one or more mesh refinement passes on the joined surface to generate a refined mesh surface.

11. The non-transitory computer-readable storage medium of claim 10, wherein the joined surface comprises a plurality of mesh triangles.

12. The non-transitory computer-readable storage medium of claim 10, wherein the first mesh boundary includes a first number of vertices, the second mesh boundary includes a second number of vertices, and the first number of vertices does not equal the second number of vertices.

13. The non-transitory computer-readable storage medium of claim 10, wherein receiving the first mesh boundary comprises receiving first user input selecting a first plurality of mesh triangles, and receiving the second mesh boundary comprises receiving second user input selecting a second plurality of mesh triangles.

14. The non-transitory computer-readable storage medium of claim 10, further comprising:
 receiving a user-defined path; and
 shaping the joined surface based on the user-defined path.

15. The non-transitory computer-readable storage medium of claim 14, wherein shaping comprises performing the one or more mesh refinement passes on the joined surface.

16. The non-transitory computer-readable storage medium of claim 10, further comprising joining a second vertex associated with the second mesh boundary to a second plurality of vertices associated with the first mesh boundary to form a second portion of the joined surface.

17. The non-transitory computer-readable storage medium of claim 10, wherein performing the one or more mesh refinement passes comprises:
 identifying a triangle associated with the joined surface;
 selecting an edge associated with the triangle;
 performing an edge flip pass on the edge;
 performing an edge split pass on the edge; and
 performing an edge collapse pass on the edge.

18. The non-transitory computer-readable storage medium of claim 10, wherein performing the one or more mesh refinement passes generates a first faired transition region between the joined surface and the first mesh boundary and a second faired transition region between the joined surface and the second mesh boundary.

19. A computing device, comprising:

a memory; and a processor coupled to the memory and configured to join meshes of primitives by:

receiving a first mesh boundary and a second mesh boundary;

removing a first surface associated with the first mesh boundary;

removing a second surface associated with the second mesh boundary;

in response to removing the first surface and the second surface, adding at least a first edge that joins a first vertex of the first mesh boundary that is located along an edge of the removed first surface with a first plurality of vertices of the second mesh boundary that are located along an edge of the removed second surface, wherein adding the at least first edge creates a first portion of a joined surface that joins the first mesh boundary and the second mesh boundary, and wherein the first portion of the joined surface joins the first vertex of the first mesh boundary and the first plurality of vertices of the second mesh boundary; and performing one or more mesh refinement passes on the joined surface to generate a refined mesh surface.

20. The computing device of claim 19, wherein the first mesh boundary includes a first number of vertices, the second mesh boundary includes a second number of vertices, and the first number of vertices does not equal the second number of vertices.

21. The non-transitory computer-readable storage medium of claim 10, wherein creating the first portion of the joined surface comprises adding a plurality of new edges that extend between the first vertex and the first plurality of vertices.

22. The non-transitory computer-readable storage medium of claim 10, wherein the first mesh boundary and the second mesh boundary are included in a single mesh, and the joined surface extends through an interior volume of the single mesh.

* * * * *